United States Patent [19]

Boyesen

[11] E Re. 30,425

[45] Reissued Nov. 4, 1980

[54] ENGINE VALVE MEANS AND PORTING

[75] Inventor: Eyvind Boyesen, Kempton, Pa.

[73] Assignee: Performance Industries, Inc., Kempton, Pa.

[21] Appl. No.: 78,499

[22] Filed: Sep. 24, 1979

Related U.S. Patent Documents

Reissue of:

[64] Patent No.: 4,000,723
Issued: Jan. 4, 1977
Appl. No.: 416,213
Filed: Nov. 15, 1973

U.S. Applications:

[60] Division of Ser. No. 375,065, Jun. 29, 1973, Pat. No. 3,905,340, which is a continuation-in-part of Ser. No. 282,734, Aug. 22, 1972, abandoned, and Ser. No. 361,407, May 8, 1973, abandoned.

[51] Int. Cl.[3] ..... F02B 33/00
[52] U.S. Cl. ..... 123/73 AA; 123/73 R
[58] Field of Search ..... 123/73 V, 73 AA, 73 A, 123/73 R, 73 PP

[56] References Cited

U.S. PATENT DOCUMENTS

| | | | |
|---|---|---|---|
| 919,036 | 4/1909 | Langer | 137/512.1 |
| 2,639,699 | 5/1953 | Kiekhaefer | 123/73 V |
| 3,687,118 | 8/1972 | Nomura | 123/73 PP |

FOREIGN PATENT DOCUMENTS

| | | | |
|---|---|---|---|
| 802733 | 2/1951 | Fed. Rep. of Germany | 123/73 AA |
| 1194635 | 6/1965 | Fed. Rep. of Germany | 123/73 A |

OTHER PUBLICATIONS

Motorcycle, "Technical," by Vic Willoughby published Jan. 19, 1972, p. 9, Great Britain.

Schnelle Motoren Seziert und Frisient; Helmut Hutten, 1966, pp. 196–226.

Motor Cycle World, Aug. 1968, "Reed Valve Lobito/-Van Tech.," pp. 18–23.

Kawasaki Technical Review, Kawasaki KT-28, Apr. 1, 1969, pp. 44–50.

*Primary Examiner*—Wendell E. Burns
*Attorney, Agent, or Firm*—John T. Synnestvedt; Kenneth P. Synnestvedt

[57] ABSTRACT

A two-cycle crankcase compression internal combustion engine having extended and specially positioned intake porting and reed-type intake valves, with the porting and valves arranged to improve various of the operating characteristics of the engine.

1 Claim, 16 Drawing Figures

12
52
10
16
46
62
10
27
22
18
34
20
14
53

C
62
16
38
42
52
18
27
9
64
42
9
18
16
27
38
42
20
53
62

ENGINE VALVE MEANS AND PORTING

Matter enclosed in heavy brackets [ ] appears in the original patent but forms no part of this reissue specification; matter printed in italics indicates the additions made by reissue.

The present application is a division of my application Ser. No. 375,065, filed June 29, 1973, [now] *and issued Sept. 16, 1975 as* U.S. Pat. No. 3,905,340, which in turn is a continuation-in-part of my prior application Ser. No. 282,734 filed Aug. 22, 1972, *abandoned,* and of my prior application Ser. No. 361,407 filed May 8, 1973, [both now] abandoned.

As in my prior applications just identified, the present invention has the general objective of improving the performance, power output, flexibility, response and fuel economy of internal combustion engines, especially two-cycle, variable speed, crankcase compression engines as used, for example, on motorcycles.

The entire disclosures of my prior applications above identified are hereby incorporated in the present application by reference.

The present application also contemplates certain alternative arrangements and further improvements as compared with my prior applications, as is more fully explained hereinafter with references to the drawings of the present application.

A. SUMMARY OF THE INVENTION

In considering some of the major general objectives of the invention it is first noted that performance characteristics of engines and especially of two-cycle engines are determined in large part by the fuel intake capabilities, which are in turn governed by the total cross-sectional area of the intake passages, the duration of the intake, the portion of the cycle during which intake occurs, and the responsiveness of the action of the intake valves. With these features in mind the present invention provides novel arrangements and interrelationships of intake porting and reed valves which mutually contribute to an increase in the cross-sectional intake flow area for the fuel, to an extension of the portion of the cycle during which intake of fuel occurs, and to increased responsiveness or sensitivity of the intake valves.

Various of the features of the present invention which contribute to the foregoing general objectives will be explained more specifically hereinafter, following a brief description of the prior art in this field.

B. DESCRIPTION OF THE PRIOR ART

In two-stroke engines of the crankcase compression type, the moving piston is utilized to effect the intake of a charge of combustible fluid into the cylinder of the engine and to effect the exhaust of burned gases from the cylinder of the engine. Basically, this is accomplished by using the piston to uncover and cover three types of ports—an inlet port, an exhaust port, and a transfer port—formed in the walls of the cylinder. On the upstroke of the piston, combustible fluid is drawn into the crankcase by the ascending piston and is compressed therein on the down stroke of the piston and is then transmitted by a transfer port to the combustion chamber of the engine. The piston uncovers both the transfer port and the exhaust port thereby effecting the intake of combustible gases and exhaust of spent gases.

At the outset, problems were encountered in the two-stroke design because of the mixing of the incoming combustible charge with the outgoing exhaust gases, with a resulting decrease in power output and fuel economy. Efforts to solve this problem have included deflector—top pistons wherein a deflecting surface on the top of the piston directs the incoming combustible charge toward the cylinder head of the engine to prevent the charge from being drawn out through the open exhaust port. This solution was displaced by later techniques of cylinder scavenging wherein the velocity and direction of the charge issuing from the transfer ports is controlled and resonances or pressure pulses in the exhaust and inlet tracks are harnessed for precise control of gas flow. These techniques are disadvantageous from the standpoint that the resonance points or pressure pulses are a function of engine speed and optimal conditions occur only over a very narrow speed range. Thus, these efforts resulted in engines which are not flexible in terms of producing power output over a varying range of engine speeds.

Some measure of control over the above noted problems has been achieved by the use of reed valves for delivering in time fashion, the charge of combustible fluid to the inlet port of the engine. However, such designs have utilized a single reed petal or flap, formed of a piece of thin spring steel or a valve assembly having a plurality of such flaps. These single stage designs place opposing requirements on the reed petal structure which must be comprised with the result that engine response and power, particularly in the low speed range is reduced. A brief consideration of the design illustrates the problem involved. At low engine speeds, vaccum on the downstream side of the valve is low and to provide a valve which will operate under these conditions to time the flow of the incoming charge, it would be necessary to utilize a relatively yieldable reed petal, i.e., one having a low spring constant. However, such a reed petal does not provide optimal performance at middle and high engine speeds because at higher engine speeds, the vacuum developed in the crankcase becomes greater resulting in a greater pressure differential across the reed and at such pressure differentials, the reed petal tends to flex open to or near the position of greatest opening. In addition, as the engine speed is increased the rate at which the crankcase is placed alternately under pressure or vacuum by the rapidly moving piston is increased. Under these conditions, the frequency of response of the reed petal (the time required by the reed petal to open and close) is exceeded and the reed petal therefore fails to provide positive control of the timing and strength of the incoming charge and allows the spit back of portions of the incoming charge into the carburetor. Further when the alternations in the crankcase from vacuum to positive pressure occur at intervals which are less in time than the response time of the reed petals, the reed petal, as it is in an open position, is subjected to the high positive pressure developed by the descending piston. As a consequence of this, reed petal life is substantially diminished because of the uncontrolled flexure of the reed petal as it opens and whipping of the reed petal as it closes. Reed stops have been employed to limit flexure of the reed petal, but such stops limit the opening of the reed petal, thereby restricting the flow of charge through the valve. Conversely when a less yieldable reed petal is utilized, i.e., one having a higher spring constant, low speed performance of the engine is adversely affected because the low vacuum existing on the downstream side of the valve is insufficient to open the reed petal for a duration long enough to insure an adequate incoming charge. Present designs of this type are engineered to provide a compromise between low speed and high speed performance so that at the mid range of speed, power output is maximized but power output in the low speed and high speed ranges is less than optimal.

One known attempt to solve the problems referred to herein above is shown in U.S. Pat. No. 2,689,552 to E. C. Keikhaefer. In that design, a single reed petal is utilized to open and close an inlet port to the crankcase of a two-cycle engine. An additional, shorter spring flap is placed over a portion of the reed petal so that, at low engine RPM, the free end of the reed petal flexes to admit an incoming charge, and at high RPM the entire reed petal flexes against the action of the overlying spring to provide the timed delivery of combustible mixture to the crankcase.

In addition, engines having transfer ports extending from the intake tract to the combustion side of the piston have been proposed, as in U.S. Pat. No. 3,687,118 to K. Nomura. As will be noted, the aforementioned patent discloses the use of a reed valve assembly employing single reed petals. In this design, the crankcase is cut off from the inlet tract for a significant portion of the cycle, about 90°. Thus, while advantage is taken of the additional transfer capabilities of this design arising by reason of the fact that negative pressure pulses in the exhaust port draw combustible gas to the combustion side of the piston, there is, however, a restriction in the total capability of this design because the intake tract is cut off from the crankcase during this critical portion of the engine cycle, when certain phenomena could be utilized to improve scavenging and performance. Also, engines of this basic design having pistons with ports in the skirt thereof have been proposed. In these designs, such ports have been placed in the lower portion of the skirt of the piston and thus the piston still acts to close off the intake tract from the crankcase for a significant portion of the cycle. Such designs have contemplated positioning the piston ports so that communication between the inlet tract and the crankcase is cut off until almost 45° to 50° after bottom dead center position of the piston. In such designs, when the piston ports uncover the intake port, reed valves positioned in the intake tract snap open. This results in a discontinuous flow of combustible fluid to the engine and in the intake of lesser volumes of combustion fluid in comparison to engines utilizing aspects of the invention disclosed herein.

C. OBJECTS AND ADVANTAGES

In addition to the general objectives hereinabove referred to the invention also has other objectives including the following:

Thus, it is another object of this invention to provide improved reed valves for the control of combustible fluids to internal combustion engines and particularly to engines of the two-stroke design.

It is an additional object of this invention to provide a valve assembly having increased life.

Further, it is an object of this invention to provide two-stroke engines having increased power output, a broader power band, and improved power characteristics.

It is also an object of this invention to provide a method and means for obtaining a supercharging effect to increase the volume of the charge of combustible fluid introduced into the combustion chamber of an internal combustion engine.

It is still another object of the invention to provide greatly increased intake porting for a two-cycle engine and to provide for an increase in the portion of the cycle during which the intake porting is open.

It is a further object of the invention to provide a port in the piston skirt, for delivery of fuel into the crankcase for compression therein, which skirt port is so located in the piston skirt as to remain open when the transfer ports are open and which is so located as to provide for communication between the intake chamber and the crankcase when the piston is positioned to block the intake porting so that there is constant communication between the intake chamber and the crankcase throughout the entire cycle of the operation of the engine.

The invention has as a further object the employment of special intake ports, herein referred to as injector ports, interconnecting the intake passage at a point just downstream of the intake valve with the transfer ports, thereby providing still another channel through which intake of fuel may occur whenever the transfer ports are open.

How the foregoing and other objects and advantages are obtained will be clear from the following description referring to the accompanying drawings in which.

Figure 1:
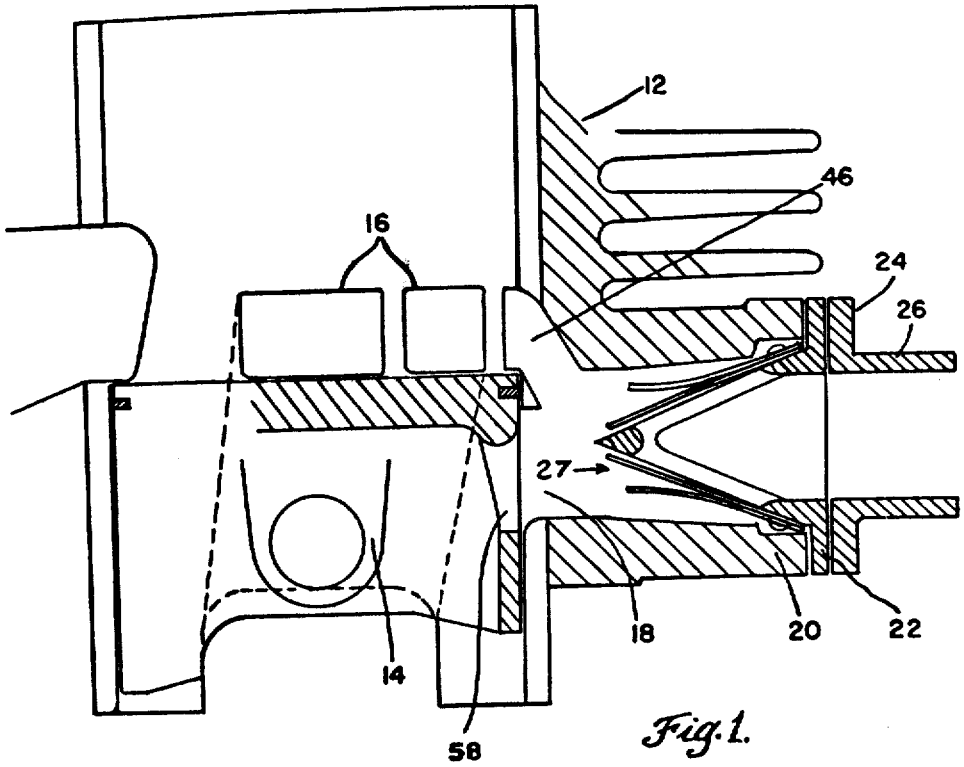
FIG. 1 is a sectional view of a two-cycle internal combustion engine having intake valves and intake porting conforming with the present invention.
Figure 2:
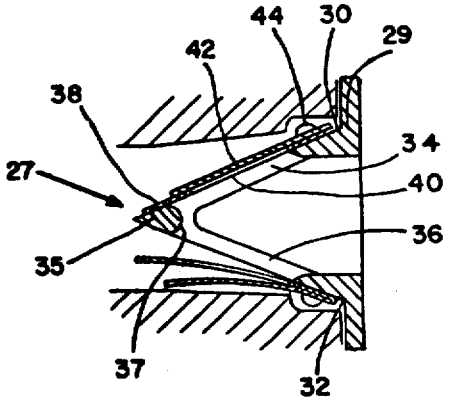
FIG. 2 is a section of certain of the valve ports shown in FIG. 1.
Figure 2G:
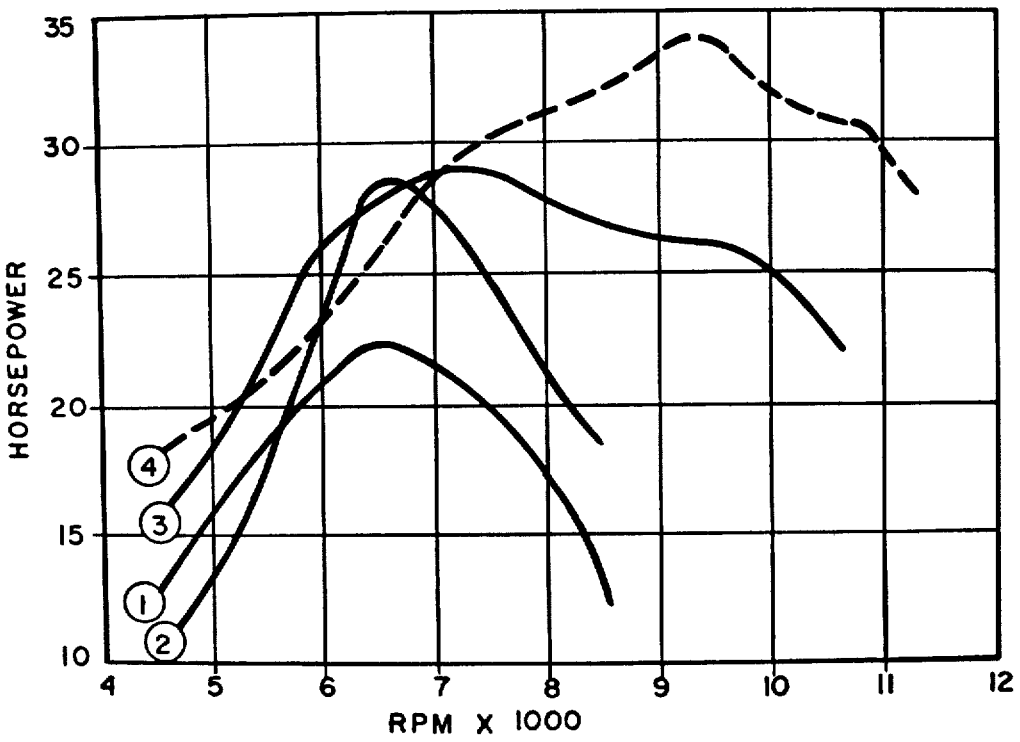
FIG. 2G is a graph showing comparative curves representing the power output in relation to speed for conventional two-cycle engines and for engines utilizing certain features of the invention as disclosed in FIGS. 1 and 2.

Turning now to the drawings, reference is first made to the embodiment illustrated in FIGS. 1, 2 and 2G.

Referring to FIG. 1, there is shown therein a schematic representation of a two-cycle piston engine having a cylinder 12 and a piston 14.

The cylinder 12 includes main transfer ports 16 for delivering a combustible gas from the crankcase (not shown) to the combustion side of the piston 14. As is conventional, combustible gases pressurized by the descending piston, flow from the crankcase through suitable conduits (not shown) to the main transfer ports 16.

The cylinder 12 also includes an inlet port 18 which communicates with a valve housing 20 which may be mounted on or formed integrally with the barrel of cylinder 12, and which housing defines, at least in part, the above-mentioned intake passage or tract.

A valve assembly 27 is received in the housing 20 and may be secured therein by a readily removable cover plate 24 that extends over the flanges 22 of the valve assembly and which preferably includes an intake passage extension 26 for receiving a carburetor (not shown) thereon.

Referring to FIGS. 1 and 2, a preferred embodiment of a type of valve is shown therein in greater detail. The valve assembly 27 can include a valve body 29 having two convergent surfaces 30 and 32 joined in an apex by a transverse member 35. The surfaces 30 and 32 include at least one opening 34 and 36 extending through each of the surfaces 30 and 32. While the opening 34 and 36 could be made in the form of one continuous opening, it is preferred that at least two openings be formed in the surfaces 30 and 32 for reasons as will be hereinafter explained. It should be noted that in FIG. 2 the reed petals 38 and 42 at the top are shown closed, but those at the bottom are shown open. It will be understood that in actual use the flexing of both sets of reed petals on both sides of the valve will always be substantially the same, depending upon the operation condition.

As the reed petal assemblies to be hereinafter described are the same on surface 30 as on surface 32, hereinafter reference will be made only to the reeds disposed on surface 30, it being understood that the comments so made are equally applicable to the assemblies on surface 32. Disposed over the opening 34 is a primary reed 38. The size and shape of the primary reed is such that peripheral surfaces thereof extend beyond side edges of the openings 34 so that the flow of fluid through opening 34 is substantially precluded when the reed 38 is urged by its own resilience against the surface 30.

The primary reed 38 has a vent or opening 40 formed therethrough. A secondary reed 42 of a size and shape sufficient to overlay vent 40 is mounted over the vent 40 by, for instance, a machine screw 44 that secures both the secondary reed 42 and the primary reed 38 to the valve body 29.

The primary and secondary reeds 38 and 42 respectively are both formed of a yieldable, resilient material. However, it is important that the secondary reed 42 be more yieldable than the primary reed 38 because secondary reed 42 must open at lower intake port pressures than primary reed 38, as will hereinafter be described. It should be understood that any thin, resilient material can be used to form the primary and secondary reeds. A preferred material that has been used with good result is a woven glass fiber and epoxy laminate commonly identified as G-10, for example as marketed by the Formica Company. Reed assemblies of this material wherein the thickness of the primary reed is about 0.022" to about 0.026" and wherein the thickness of the secondary reed is about 0.014" to about 0.016" have been found satisfactory.

An arrangement similar to that described above is illustrated in FIG. 3, which latter Figure is more fully described hereinafter, but with reference to which it should be noted that it is preferred in all of the arrangements according to the invention that the primary reeds 38 should overlie the entire opening 34, (shown in broken lines in FIG. 3), and further that the primary reeds 38 are wider and longer than the secondary reeds 42. This has the advantage of greatly reducing the mass of each secondary reed 42 making it more responsive to lower pressure differentials across the valve assembly and more able to work independently of the operation of primary reed 38.

In addition, it should be noted that the vent 40 is positioned closer to the end of reed 38 which is secured to the valve body 29. This allows the length of the secondary reed 42 to be kept to a minimum, thereby resulting in a decrease in the mass of the secondary reed as heretofore noted.

Also the provision of the vent 40 reduces the mass of the primary reed 38 thereby further decreasing inertial effects on that reed. The decrease in mass of the primary and secondary reeds, it is believed, results in increased reed life as it reduces overflexing and eliminates the need for reed stops. Furthermore, when both primary and secondary reeds are open, a larger volume of charge passes through the valve, in comparison to single reed valves, because the impedance of the primary reed to flow is reduced as portions of the charge can flow through the vent which is opened by the more yieldable secondary reed.

By providing a plurality of openings 34 and 36 and concomitantly a plurality of primary reeds and secondary reeds, the mass of each of the reeds is maintained at a minimum. This in turn reduces inertial effects on the primary and secondary reeds and increases the frequency of response of the reeds thereby making the engine more responsive to changes in throttle settings.

As can be seen in FIGS. 1 and 2 the valve body 29 includes a transverse apex forming member 35 formed at the point of convergence of surfaces 30 and 32. The member 35 has formed thereon an aerodynamic surface 37 which gives the member 35 an air foil or tear drop cross section. Thus formed, the member 35 offers minimum resistance to passage of incoming gas. In single stage reed designs as heretofore discussed the corresponding surface 37 of the apex member 35 is flat or pointed and presents a non-aerodynamic subsonic barrier to the passage of gases thereover. The flat or pointed surface is required in certain single reed designs to lift the reeds from the surfaces of the valve body to which they were mounted, by means of the shock and turbulence created at the apex member, which, it is felt, interferes with the timed, uniform delivery of the charge into the intake port.

Referring to FIGS. 1 and 2, the valve assembly as heretofore disclosed operates in the following manner. At very low engine speeds, the secondary reed 42 opens each time the piston 14 moves upwardly in the cylinder 12 to uncover the inlet port 18, as the force generated by the pressure of the combustible gas, for instance, air-fuel mixture from a carburetor (not shown) on the upstream side of the secondary reed 42 is sufficient to overcome the resistive force generated by the relatively yieldable secondary reed. This allows the passage of a quantity of air-fuel mixture into the inlet port at each stroke of the piston and provides a timed supply of the air-fuel mixture to the cylinder 12 at very low engine speed. As the engine speed increases to mid range, the pressure differential across the valve assembly becomes great enough to cause the primary reed 38 to begin to operate, alternately opening and closing with the stroke of piston 14 to deliver a timed charge of the air-fuel mixture through the opening 30 to the inlet port 18. In the high speed range, because of the high vacuum conditions existing at the inlet port 18 and the increased frequency at which the crankcase changes from a condition of positive pressure to a condition of vacuum, secondary reed 42 remains open, varying in position in accordance with the crankshaft rotation, while the less yieldable primary reed 38 continues to provide a timed charge in the manner heretofore described. Thus, the system described provides valve timing throughout the entire speed range of the engine. The blow back of the air-fuel mixture through the opened vents 40 at high RPM is prevented by the restricted area of these vents and by the momentum of the entering high velocity intake charge.

Referring again to FIG. 1, the more efficient porting involves an increase in the charge delivered to the combustion side of the piston 14, by reason of a supercharging effect at low RPM occurring through main transfer ports 16 and auxiliary transfer port 46. This supercharging effect at low RPM ranges results from the low pressure wake occurring in the crankcase as the compressed charge suddenly exits from the crankcase through the main transfer ports 16 and auxiliary transfer port 46. The low pressure in the crankcase is communicated via a port 58 in the piston (more fully described hereinafter) to the intake port 18. This in turn causes secondary reed 42 to open early, about 45° before BDC at low engine speeds, delivering a charge to the auxiliary transfer port 46, immediately downstream from the valve assembly and to the inlet port 18 and thence through the crankcase to the transfer ports 16. This increased charge is in turn delivered to the compression side of the piston, thereby improving scavenging of the exhaust gases and charging of the cylinder, which results in an increase in the overall compression ratio of the engine and thus an increase in the power output.

An advantage of the system herein described is that at high RPM, the flow of the air-fuel mixture into the intake port 18 is significantly more constant because the secondary reeds 42 remain open. In systems using single reeds, the flow of the air-fuel mixture is stopped and started by the opening and closing of the single reed thereby reducing the speed and uniformity of the flow of the air-fuel mixture into the intake port 18.

Another advantage of the valve assembly herein disclosed is that the secondary reeds, which operate at low engine pressure differentials and which have faster response times allow a more efficient porting of the cylinder and piston. Single reed petal designs require greater vacuum in the inlet port to open the reed petals and require the piston to close off the intake system from the crankcase so that the necessary vacuum can be achieved. The foregoing is a problem occurring most frequently in larger displacement engines, for instance engines having a displacement exceeding 100 cc. As the valve assembly herein disclosed does not require the buildup of a high vacuum to operate the secondary reeds, the intake system of the engine may be ported directly to the crankcase at all times to yield better flow of the air-fuel mixture at low engine speeds for larger displacement engines.

Another advantage realized by the vented reed system herein disclosed is increased responsiveness of the engine. This arises from the situation that when the throttle plate of the carburetor (not shown) is closed, the vacuum upstream from the valve assembly 27 is the same as the crankcase vacuum and both reeds remain closed. But immediately upon the opening of the throttle plate in the carburetor (not shown), the vacuum upstream of the valve assembly 27 drops while the vacuum in the crankcase remains. The vented reeds snap open earlier and more quickly, in comparison to single reed designs, because the vented valves are responsive to lower pressure differentials occurring across the valve assembly and provide more area for the flow of gases with less flexing, as earlier described.

Another advantage to the design herein disclosed is vastly increased life of the reeds. In single stage reed designs fatigue failures of the reeds begin occurring within twenty hours of service. Attempts to eliminate this situation include the use of spring steel reed elements. While these reed elements exhibit a longer life, failure of these elements results in destruction of the engine if the steel reeds are drawn into the cylinder. Dual reed assemblies of the type herein disclosed, on the contrary, have exhibited a normal service life in excess of one year.

Referring to FIG. 2G, there is shown therein a graph indicating the power output in relation to engine speed for an engine modified as heretofore described. The graph shows the result of tests performed on a 250 cc. two-cycle engine utilizing, in stock form, piston controlled inlet ports and exhaust expansion chambers for exhaust extraction.

The line identified by the numeral "1" represents the results of dynamometer testing for the above engine not utilizing reed valves of the type herein disclosed and employing carburetor jetting suitable for normal use at varying speeds and loads. As can be seen from the graph, peak power of about 22 horsepower is developed at a speed of about 6600 RPM and power output falls off rapidly beyond the peak power speed.

Line 2 shows the result of testing the engine as equipped in test 1 with the exception that the carburetor jetting was chosen to obtain maximum dynamometer power. A maximum power of about 28 horsepower was achieved at a speed of approximately 6600 RPM. Again, as with test 1, there was experienced a rapid fall off in power after the peak power point, and maximum RPM safely achievable was indicated to be about 8500 RPM. It should be pointed out that the engine as set up in test 2 was not suitable for use in applications requiring varying speeds as the mixture became unduly rich each time the throttle plate was closed thereby loading the cylinder with unburned fuel.

In test 3, an engine of the type used in tests 1 and 2 but further including reed valves of the type herein disclosed plus auxiliary transfer [portion] *porting* of the type herein disclosed was tested. As can be seen from the graph of test 3, power output below 5000 RPM is significantly increased, somewhere in the order of 50% and peak power of about 29 horsepower was achieved at a speed of about 7300 RPM. Moreover, power output beyond peak power speed falls off more gradually than that for the number 1 and number 2 tests. Further, maximum engine speeds of almost 11,000 RPM were achieved.

In test 4, an engine with the same modifications as that in number 3 and further including a carburetor with a larger venturi diameter, auxiliary transfer porting, modified exhaust porting, and a modified exhaust expansion chamber was used. Peak power on this engine rose to 34 horsepower at a speed of about 9200 RPM. Maximum engine speed was found to be in excess of 12,500 RPM.

It should be understood in connection with the vented reed valve arrangement heretofore discussed that valve assemblies having more than two reeds are contemplated according to the invention. For example, triple reed valve arrangements may be employed, in which event the secondary reeds will be apertured or vented, so that the third or tertiary reeds serve to open and close the vent in the secondary reeds. In this case, the tertiary reeds are desirably smaller and more flexible than the secondary reeds.

Figure 3:
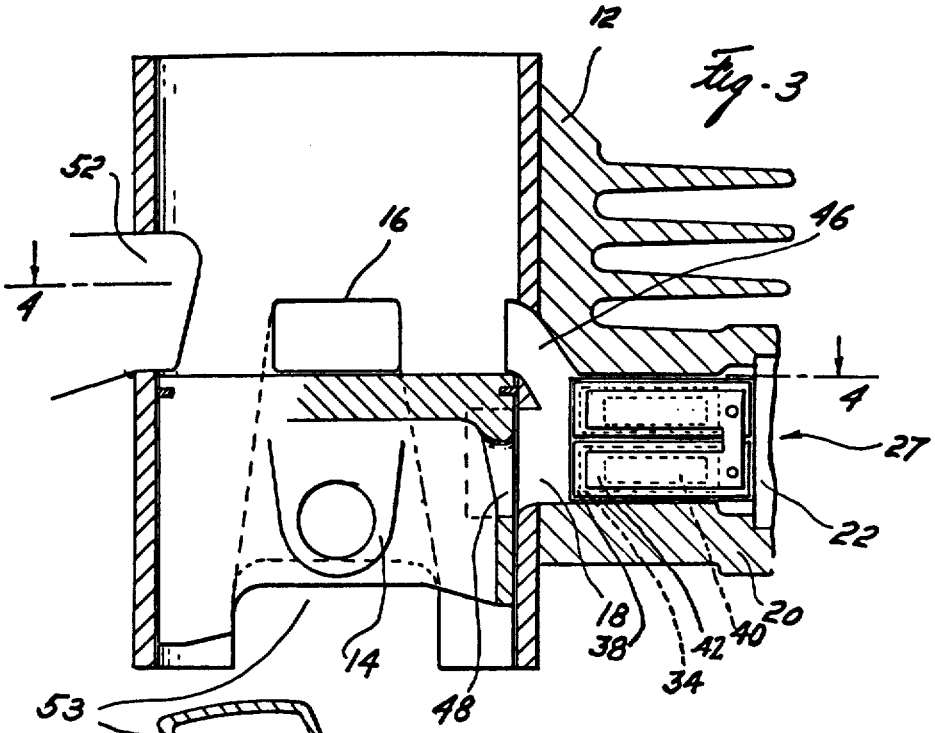
FIG. 3 is a view similar to FIG. 1 but illustrating a modified valve arrangement.

With further reference to FIG. 3, it is pointed out that the arrangement of FIG. 3 is similar to that described above and that all of the parts described above are also employed, but the reed valve assembly is differently positioned in the valve housing 20. In effect, the reed valve assembly in FIG. 3 is merely rotated 90° in the valve housing, as compared with its' position in FIGS. 1 and 2. Because of the angular position of the valve assembly in FIG. 3, the reed valves themselves occupy a different position in relation to the porting and to the axis of the cylinder. This is of advantage because it allows a more predictable flow pattern of combustion fluid through the system, expecially during high speed engine operation. The flow is more evenly divided between the sets of reeds disposed on each side of the valve body 29 and is directed in a manner which conforms to the natural directions of the fluid flow through the engine, i.e., curved toward the sides of the crankcase where the transfer passages are open to the crankcase, by reason of the fluid flowing through the valve port which acts as an orifice having a fixed side and a yieldable side defined by the reeds which cause the flow to curve. By reason of the orientation of the valve assembly as shown in FIG. 3, the reeds are placed closer to the port 46 and the flow into port 46 is smoother because the fluid does not have to flow upwardly from the reeds as in the FIG. 1 embodiment.

This orientation of the reed valves is also desirable because it improves cold starting of the engine, which is particularly advantageous with engines requiring manual starting. The reason for this is that when the engine is at rest, there is no vacuum in the crankcase to operate the reeds. Thus, at start-up, the engine must be cranked to develop sufficient vacuum in the crankcase to cause the reeds to open and allow the passage of the combustion fluid into the engine. When the valves are positioned as shown in FIG. 1, the combustion fluid passing through the bottom set of reeds must flow upwardly as it enters the valve assembly 27 so that it can exit through the vent in the primary reed 38. These factors require a greater vacuum to be developed in the crankcase in order to draw the combustion fluid through the valve assembly and this necessitates higher cranking speed at start-up. When the arrangement shown in FIG. 3 is used, the only forces which must be overcome in order to draw combustion fluid through the valve assembly are the resistive forces developed by the secondary reeds. This reduces the vacuum required to draw the combustion fluid through the valve and correspondingly decreases the cranking speed or starting effort required. In some engines this difference is so great as to make it practical to manually start the engine if the valve arrangement of the invention is used, whereas manual starting would not be practical without the valve arrangement of the invention.

In connection with the orientation with the reed valves as shown in FIG. 3, it should be kept in mind that in many installations such as motorcycles and snowmobiles, the intake passage and also the engine itself is somewhat inclined in a direction so that liquid fuel would tend to flow from the carburetor through the intake passage and intake port into the cylinder. This inclination is shown in FIG. 3. With the valves oriented as in FIG. 3, some liquid fuel may readily leak past the valves or may accumulate immediately upstream of the valves, which is in contrast with the condition when the orientation of the valves is as shown in FIGS. 1 and 2. The arrangement of FIG. 3, particularly where the intake passage and engine is inclined, is therefore of special advantage where easy starting is an important factor.

It should be noted that the foregoing benefits are achieved from orientation of the valve assemblies as shown in FIG. 3 with vented reeds as heretofore disclosed, and also with single reed designs. Single reed designs benefit because the single reeds are less yieldable than the vented reeds and therefore do not open as easily.

Turning now to FIGS. 4, 5, and 6A to 6E, attention is directed to the porting employed in accordance with the present invention.

Figure 4:
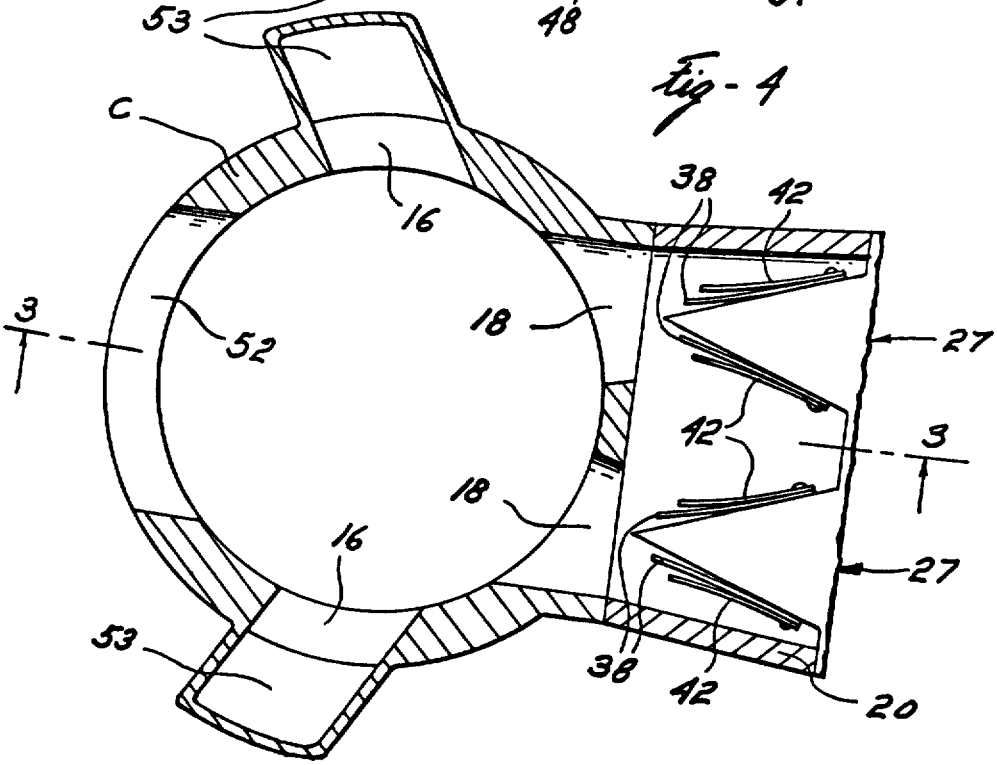
FIG. 4 is a view of a cylinder showing certain improved inlet ports and showing also an arrangement of valves positioned as in FIG. 3.

FIG. 4 shows a cross-section, taken along line 4—4 of FIG. 3, of a typical cylinder showing the preferred manner of mounting the valve assemblies 27 in relation to the cylinder. In this embodiment, two valve assemblies 27, are positioned vertically as discussed above with respect to FIG. 3 in a housing 20 which is attached to the cylinder C. The valve assemblies 27 are positioned so that each valve assembly is aligned with one of the intake ports 18. The use of the two valve assemblies 27 is advantageous because it causes the flow of combustion fluid to agree with the natural flow pattern of the engine, and this results in a smoother, more directional flow of combustion fluid through the engine. The combustion fluid flows through each of the valves 27 into an aligned inlet port 18 and into the crankcase of the engine and from there into the transfer passages 53 and is introduced to the combustion side of the piston through the transfer ports 16. It should be noted that this is particularly important in the preferred embodiment of cylinder arrangements as shown in FIGS. 3 and 4 because in such designs, the axes of the transfer ports 16 are angularly displaced from the axis of the intake tract by about 90°, as is shown in FIG. 4. These designs require that the combustion fluid make an abrupt change in direction once inside the engine, i.e., a direction change of 90° to either side of the engine to enter the transfer passages 53, and without the arrangements as shown in FIGS. 3 and 4, the charge has little inherent directional tendency to flow toward either side of the crankcase, and in fact does not do so until after the charge has been compressed and flow starts through the transfer passages. At high operating speeds, the time during which the change in direction can occur is short and therefore the change must occur quite rapidly. When using the double valve assembly arrangement shown, the valve assemblies give direction to the combustion fluid streams before the streams enter the engine. This predetermining results in the combustion fluid stream undergoing the direction change more efficiently, rapidly, and smoothly, thereby ultimately resulting in the delivery of a larger volume charge to the combustion side of the piston.

It should be noted that the axis of the entire inlet tract of the engine shown in FIG. 4, including the valve assemblies 27 and the intake ports 18, is positioned so that it is aligned along a radius emanating from the center of the cylinder bore and is angularly offset from the axes of the transfer ports.

Figure 5:
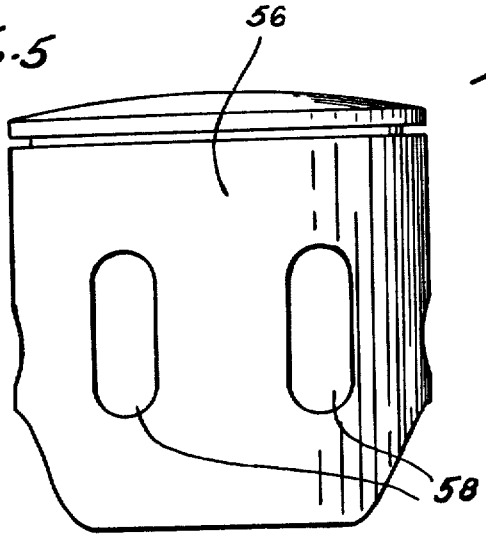
FIG. 5 is an elevational view of a piston adapted for use in an arrangement according to the present invention and incorporating extended porting, as described hereinafter.

There is shown in FIG. 5 a piston 56 which is usable in conjunction with a cylinder such as shown in FIG. 4. The piston 56 includes two spaced piston ports 58, each of which is positioned to be aligned with one of the intake ports 18 of cylinder C. An important aspect of the piston shown in FIG. 5 is that the height of the ports 58 is greatly increased over that of prior designs. As will be hereinafter more fully explained, this results in allowing the inlet ports 18 (and thus the inlet tract including the reed valves) to communicate with the crankcase at all times during the engine cycle. The height of the ports 58 can be increased in designs as shown in FIGS. 3 and 4 both with single reed valves and with vented valves as heretofore disclosed. This is so because the improved fluid flow resulting from the vertical placement causes the engine to start more easily and does not require the intake ports to be closed off from the crankcase in order that sufficient vacuum be developed to operate the reeds—the mode of operation necessary in designs having horizontally oriented reeds. The increased height of the piston ports, and the concomitant increase in port area allows a longer induction period and thus greater charge of fuel to be inducted into the engine and this results in higher engine outputs.

There is shown in FIGS. 6A–E a schematic representation of the operating cycle of an engine employing vented reed valves of the type heretofore described and employing a ported piston as shown in FIG. 5.

Figure 6A:
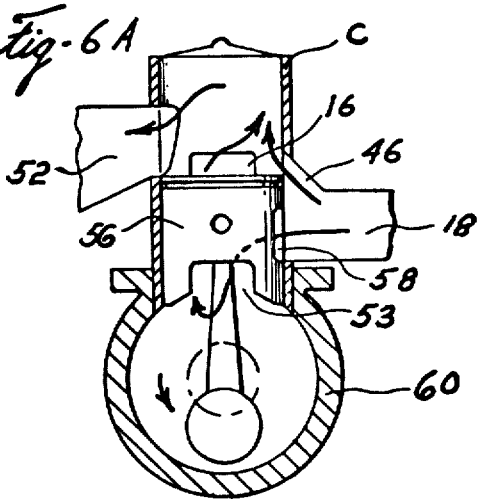
FIGS. 6A, 6B, 6C, 6D and 6E are schematic illustrations showing the operating sequence of an engine employing porting arrangements according to the present invention.

FIG. 6A shows the position of the piston 56 just slightly before it reaches bottom dead center. The combustion fluid charge compressed by the descending piston 56 has exited from the crankcase 60 and is introduced via the transfer ports 16 and somewhat through auxiliary port 46 to the combustion side of the piston. As described above, the rapid exiting of the compressed combustion fluid from the crankcase 60 causes a vacuum to be created in its wake in the crankcase 60. This vacuum is transmitted via the piston port 58 to the reed valves which open allowing the introduction of additional charge of combustion fluid through the auxiliary transfer port 46 to the combustion side of the piston and also into the crankcase 60 through the piston port 58 resulting in extended delivery of charge through ports 16 (as shown by the arrows). This creates what is known as a supercharging effect in the lower RPM ranges and results in higher engine outputs.

There is also a supercharging effect which occurs at high RPM. At high RPM, it will be recalled, the secondary reeds remain open, by reason of the fact that the incoming charge of air-fuel mixture is travelling at high velocity and has significant momentum and, therefore, the charge continues to flow through the open vent in the primary reed and allows the system to maintain a higher delivery rate. Also, at piston bottom dead center, typical exhaust expansion chambers are supplying suction to the cylinder. At this position, the auxiliary transfer port 46 is open to the combustion side of the piston, and because of the high momentum of the incoming charge which maintains secondary reeds open at high RPM, a portion of air-fuel mixture flows directly from the intake tract, through the port 46. Thus, this portion of the charge bypasses the crankcase at high RPM, to fill the cylinder thoroughly. Any of the charge tending to escape through the exhaust port as the piston moves upwardly is now held in the cylinder by a positive reflective wave generated by a typical exhaust expansion chamber. Also, because the secondary reeds remain open at high RPM ranges, there is an increase in the amount of charge drawn into the crankcase through the skirt port 58 and a correspondingly increased flow of gases through the crankcase and to the transfer ports.

Figure 6B:
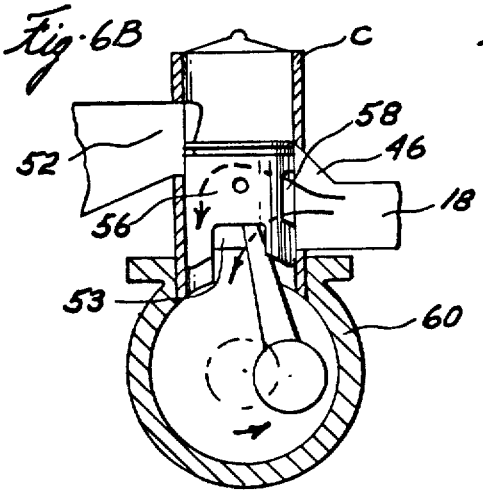

FIG. 6B shows the piston as it has just closed off the transfer port 16 and auxiliary port 46. The piston is ascending, thereby creating a vacuum in the crankcase which is communicated to the reed valves via the piston port 58, thereby causing the reed valves to open further. Combustion fluid flows from the inlet port 18, and also from the auxiliary transfer port 46 when the piston 56 has moved high enough, through the piston port 58 to the crankcase. At this point, the skirt of the piston has not yet begun opening the intake port 18.

Figure 6C:
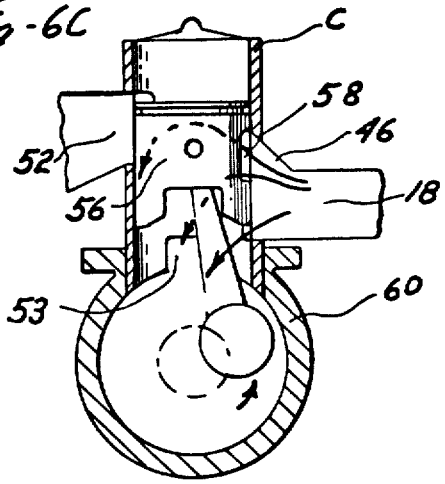

In FIG. 6C, the bottom edge of the skirt of the piston 56 has cleared the intake port. Under these conditions, the reed petals are open, combustion fluid flows beneath the bottom of the piston and also through the piston port 58 into the crankcase. It should be noted that combustion fluid flowing through auxiliary transfer port 46 is directed upwardly through the piston port 58 toward the underside of the top of piston 56. This latter flow cools the top portion of the piston.

Figure 6D:
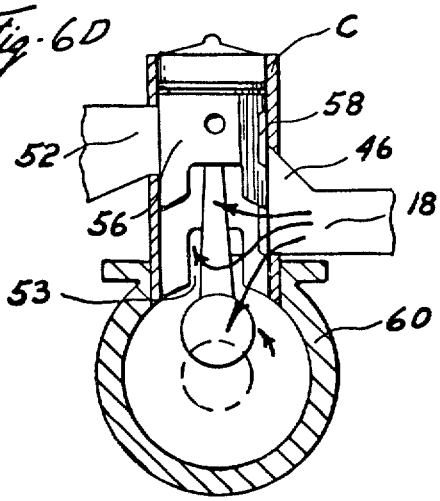

As shown in FIG. 6D, the piston 56 is approaching the top of its stroke, the bottom edge of the skirt has completely opened the intake port 18, thereby allowing a great volume of combustion fluid to be drawn into the crankcase through the open reed valves.

Figure 6E:
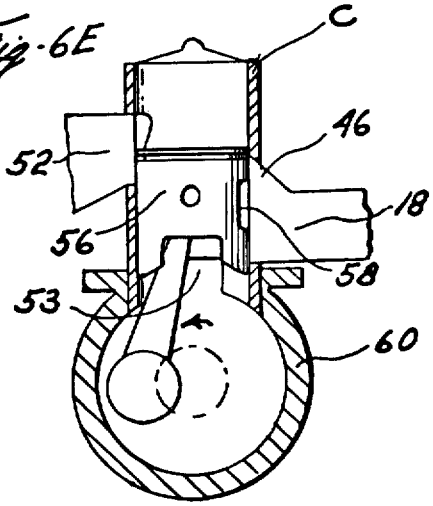

FIG. 6E shows the piston 56 descending and closing off the intake port 18. The piston is of course compressing the volume of combustion fluid drawn into the crankcase during the previous up stroke of the piston. At this time, the pressure of the fluid in the crankcase is greater than the pressure on the upstream side of the valve assembly and blowback of the pressurized charge is prevented by the closed reeds in the lower RPM ranges and by the restricted area of the vents and the momentum of the incoming charge entering through the vents at high RPM ranges. It should be noted that at all times throughout the [cyce] *cycle* the crankcase is in communication with the intake tract, either via the piston port 58, the inlet port 18, or a combination of both. This provides for the induction of larger quantities of combustion fluid into the engine and results in higher power and higher torque outputs.

Figure 7:
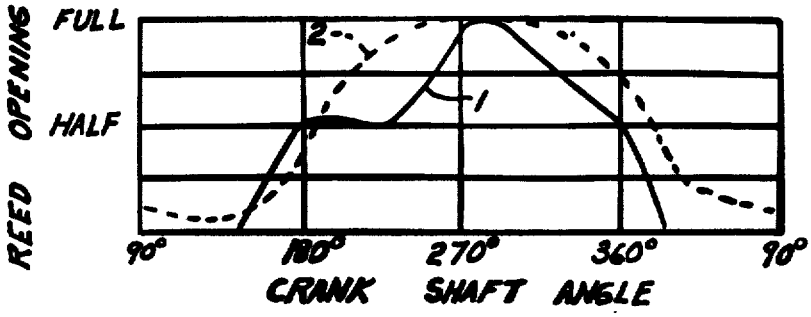
FIG. 7 is a graph showing the portion of the cycle during which the intake valves are open in the arrangements illustrated in FIGS. 1 and 3 to 6E.

FIG. 7 is a graph based upon the type of valve and port arrangements shown in FIGS. 1, 3, 4, 5 and 6A to 6E, including the vertically extended porting 58 provided in the piston skirt as shown in FIG. 5. In FIG. 7 the graph there shown plots two curves, curve 1 representing typical operating behavior of the reed petals at low intake velocities, i.e., engine speeds below the power peak, and curve 2 representing typical operating behavior of the reed petals at high intake velocities, i.e., engine speeds above the power peak. As has been seen, at high intake air velocities, the intake is open to at least some extent throughout the entire cycle of operation of the engine. As plotted in the graph of FIG. 7, 180° represents the bottom dead center position of the engine crank, and 360° represents the top dead center position of the engine crank.

It will be noted that the vertical scale of the graph of FIG. 7 represents the degree of reed valve opening, graduated at quarterly intervals from zero opening to full opening, and the lowermost quarter of this scale comprehends the extent of opening provided by the secondary reeds, it being assumed that at the one-quarter position on the graph the secondary reeds are fully open.

The graph of FIG. 7 also shows that even at low intake air velocity, the duration of reed or valve opening is extended throughout approximately 240° of the cycle of operation. This aids in maintaining relatively high output and performance at low engine RPM, under which condition both the primary and secondary reeds cycle, as has been described.

The duration of reed opening as described above in relation to FIG. 7 is greater than prior arrangements both at low as well as at high intake air velocity, and these conditions can only be achieved when the skirt porting 58 is high enough to be open whenever the piston skirt would block communication from the intake passage to the crankcase. In prior arrangements, where the skirt port is closed during a portion of the cycle, the commencement of opening of the valve is delayed to or beyond the 180° position, i.e., bottom dead center. Such prior arrangements adversely affect the torque at both high and low engine RPM.

It should be noted that the graphs shown in FIG. 7 are representative of engines employing standard transfer port timing, i.e., usually not in excess of 120° duration. It has been found that when using vented reed valves as herein disclosed, especially in conjunction with piston porting as heretofore described, that the height of the transfer ports 16, as shown in FIGS. 1, 3, and 6A–E, 9, and 10, can be raised to give greater transfer duration. Engines having transfer port durations of about 148° have been found to have power curves as depicted by line 4 of FIG. 2G. It will be noted that greatly increased power results at high RPM. In addition, the height of the exhaust port can be raised, resulting in increased scavenging time and concomitant higher engine outputs.

Figure 8:
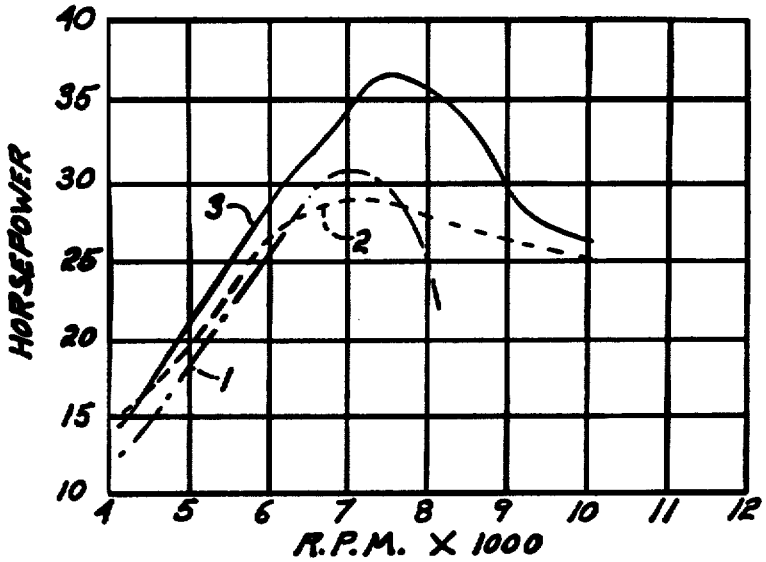
FIG. 8 is a graph showing comparative power curves of a prior art arrangement in comparison with an arrangement conforming with FIGS. 3 to 6E, and still further with curve number 3 of graph 2G.

Turning now to the graph of FIG. 8, the graph indicated by the numeral 1 represents a prior known single reed valve engine and [and] is characterized by rapid drop-off of horsepower after the power peak is passed. The curve identified by the numeral 2 is similar to curve 3 of FIG. 2G, and illustrates one arrangement or embodiment of the present invention incorporating a vented reed valve assembly. This curve shows much less tendency for the horsepower to drop off after the peak is reached. In another embodiment conforming with the present invention of the kind shown in FIGS. 3 and 4, in which multiple pairs of reed valves are arranged and in which a pair of spaced intake ports 18 are provided, a horsepower curve is shown by numeral 3 in FIG. 8 is secured. Here it will be seen that the peak horsepower is still higher and further, that the horsepower at the higher RPM levels off, instead of dropping sharply, as in the case of curve 1.

Figure 9:
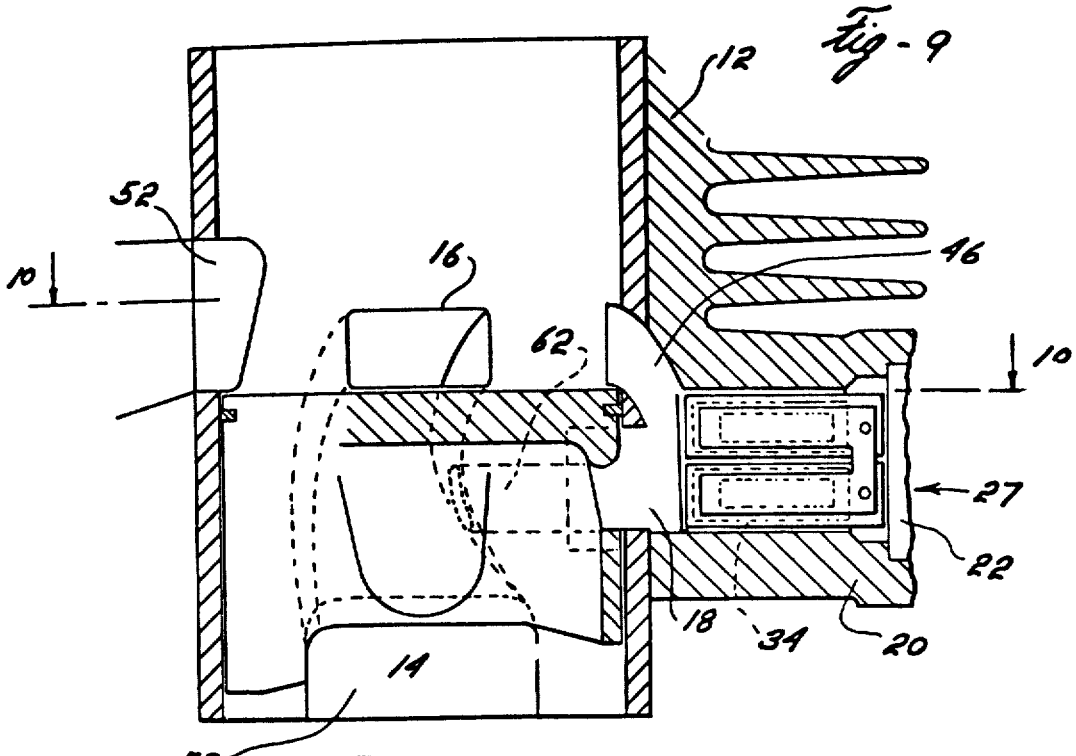
FIGS. 9 and 10 are views similar to FIGS. 3 and 4 but illustrating the provision of injector ports, as hereinafter explained.
Figure 10:
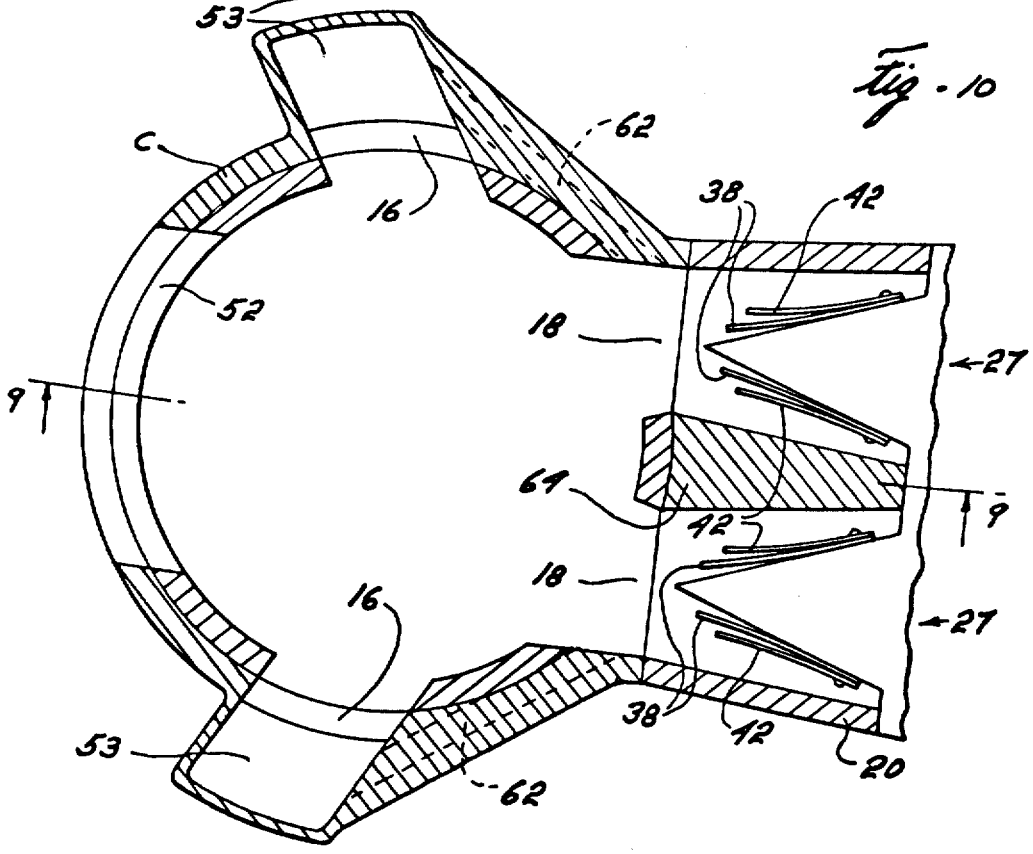

Turning now to FIGS. 9 and 10, there is here shown still another feature as applied to arrangements similar to those illustrated in FIGS. 3 and 4. Similar parts are again identified by the same reference numerals. In these figures, however, additional ports, herein referred to as "injector" ports, are provided. Two injector ports are illustrated at 62, 62. Each of these ports interconnects one of the intake passages 18 with one of the transfer passages 53, as is shown in FIGS. 9 and 10. These injector ports are open at all times, and serve to increase intake of fuel at the higher RPM's , especially above 6000 or 7000 RPM.

It will be noted from FIG. 9 that the longitudinal axis of the injector ports 62 is arranged at substantially a 90° angle to the axis of the transfer passage 53. When the charge contained in the crankcase is pressurized by the descending piston, the charge is caused to flow upwardly through the transfer passages 53 to the transfer ports 16 at high velocity. In accordance with Bernoulli's Principle, the rapidly moving charge in the passage 53 moving past the opening of injector port 62 causes an eductor effect in the injector port 62 which causes a low pressure to exist in the port 62, which low pressure is communicated to the intake tract just downstream of the reed assemblies. In this manner, a quantity of charge is drawn from the intake tract downstream from the valve assembly, through the port 62 and into the transfer passage 53. This results in a higher density charge passing through the portion of the transfer port between the injector port 62 and the transfer port 16. It is believed that injector ports can be used with beneficial results in two-cycle engine designs having valving in the inlet tract, for example, rotary intake valves. As will be noted below, in connection with the discussion of FIG. 11, especially good results are achieved when injector ports are used in engines having reed valves, especially vented reed valves of the type disclosed herein.

It is also preferred, as is shown in FIGS. 9 and 10, to provide a partition or wall 64 between the two intake channels 18 and the two pairs of reed valves, thereby aiding in directing the intake flow through the channels 18 and into the crankcase through the porting provided in the piston skirt.

Figure 11:
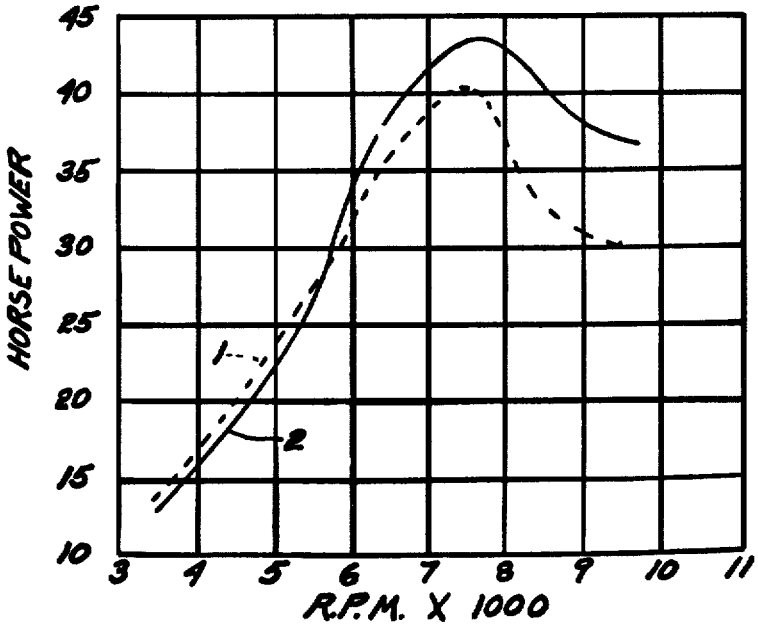
FIG. 11 is a graph showing the power curves for two engines constructed according to the present invention, in one of which the injector ports are utilized and the other of which the injector ports are not utilized.

Comparative analysis of a given engine of somewhat higher horsepower than that employed as the basis for the graphs of FIGS. 2G and 8, both with and without the injector ports gives horsepower curves such as shown in FIG. 11. Here curve 1 is a curve of an engine conforming with the arrangements of FIGS. 9 and 10 except for the omission of the injector ports, and curve 2 represents the same engine altered merely by adding the injector ports. It will be seen that the peak horsepower has been raised, and further, that the drop-off of horsepower after the peak is further reduced, which is important at high RPM.

With the foregoing embodiments in mind, it is here desired to point out certain additional advantages and desirable operating characteristics secured when employing not only the multiple reed valves herein disclosed, but also when employing various of the porting features described.

The employment of reed valves also makes possible extensive increase in the total cross-sectional area of the intake porting, as is disclosed herein, and still further makes possible considerable increase in the total time in the cycle during which the valves are open, both at low speed and at high speed. The employment of reed valves further makes possible extending the porting 58 in the piston skirt to the point where the intake tract is open to the crankcase when the transfer ports are open. The use of reed valves also enables the vertical extension of the piston skirt porting to a point such that the intake tract is constantly open to the crankcase throughout the entire cycle of operation of the engine.

It should be noted that many manufacturers of two-cycle engines have been reluctant to adopt reed valves as a means of controlling the flow of the charge to the cylinder. This is believed to be because prior reed valve designs have added to the complexity of the engine design compared with piston port intake systems, and have exhibited unsatisfactory service life, yet have yielded only modest benefits in terms of somewhat higher power output at low RPM. Applicant's vented reed design, alone and in combination with the porting arrangements herein disclosed, has on the other hand achieved very significant increases in power output, torque output, and power band width. It is believed that these improvements make the adoption of reed valves by engine manufacturers much more likely.

I claim:

1. A variable speed two-cycle crankcase compression internal combustion engine comprising a cylinder, a piston movable in the cylinder, a fuel intake system including an intake tract at one side of the cylinder and having reed valve means for controlling the flow through the intake tract, and said intake system including porting in the cylinder wall and in the piston located at the same side of the cylinder as the intake tract, *the intake tract, the reed valve means and the intake system porting in the cylinder wall all being located to confront the bottom dead center position of the piston,* the piston and the cylinder and piston porting being located and proportioned axially of the cylinder to provide flow channel means of substantial cross sectional flow area between the intake tract and the crankcase of the engine throughout the entire cycle of the engine including the bottom dead center position of the piston and thereby provide uninterrupted fuel intake during the stroke of the piston from bottom dead center to top dead center position, *the piston porting including at least one port opening and every such piston port opening being positioned axially of the piston so that substantially the entire flow area of the piston port opening communicates with the cylinder porting in bottom dead center position of the piston,* and a fuel transfer system for transferring fuel from the crankcase of the engine to the combustion side of the piston including a transfer passage communicating with the crankcase and having a transfer port through the cylinder wall and axially positioned to be closed by the piston in the region of top dead center position of the piston, said transfer port being offset from the cylinder and piston intake porting circumferentially of the cylinder so that a fuel flow path is provided in the transfer system from the crankcase to the cylinder at the combustion side of the piston independently of the intake tract.

* * * * *